United States Patent
Dlugos (10) Patent No.: US 6,676,213 B1
(45) Date of Patent: Jan. 13, 2004

(54) DIMENSIONALLY ADJUSTABLE BOOSTER SEAT

(76) Inventor: Timothy S. Dlugos, 693 Bowles La., Gardnerville, NV (US) 89410

( * ) Notice: Subject to any disclaimer, the term of this patent is extended or adjusted under 35 U.S.C. 154(b) by 0 days.

(21) Appl. No.: 09/947,299

(22) Filed: Sep. 5, 2001

(51) Int. Cl.⁷ .................................................. B60N 2/28
(52) U.S. Cl. ......................... 297/256.11; 297/219.12; 297/250.1; 297/338
(58) Field of Search .................... 297/219.12, 239, 297/250.1, 256.11, 256.12, 338

(56) References Cited

U.S. PATENT DOCUMENTS

| | | | | | |
|---|---|---|---|---|---|
| 291,931 A | * | 1/1884 | Piutti | ........................ | 297/237 |
| 1,716,746 A | * | 6/1929 | Tyner | ........................ | 297/239 |
| 2,888,976 A | * | 6/1959 | Hart | ........................ | 297/256.11 |
| 3,575,465 A | * | 4/1971 | Dolby et al. | ................ | 297/118 |
| 3,709,326 A | * | 1/1973 | Habgood, Jr. | ............... | 206/386 |
| 4,275,923 A | * | 6/1981 | Molnar | ..................... | 297/250.1 |
| 4,521,052 A | * | 6/1985 | Cone | ............................. | 297/3 |
| 4,603,903 A | * | 8/1986 | Moscovitch | .......... | 297/256.11 |
| 5,125,717 A | * | 6/1992 | Sköld | ..................... | 297/256.11 |
| 5,636,900 A | * | 6/1997 | Wilkie et al. | .......... | 297/423.19 |
| 6,089,661 A | * | 7/2000 | Aström | ........................ | 297/237 |
| 6,155,641 A | * | 12/2000 | Frost | ....................... | 297/344.12 |
| 6,254,183 B1 | * | 7/2001 | Bian et al. | ................ | 297/250.1 |

FOREIGN PATENT DOCUMENTS

| | | | |
|---|---|---|---|
| FR | 2333472 A | * | 8/1977 |
| JP | 2001191826 A | * | 7/2001 |

* cited by examiner

Primary Examiner—Peter M. Cuomo
Assistant Examiner—Joseph Edell (57) ABSTRACT

A dimensionally adjustable booster seat for use in combination with a seat belt system, including a seat back and a plurality or set of optional seating planes that are stack-able to form a 3-dimensional trapezoid base, and a coupling mechanism for detachably receiving combinations of the optional seating planes to the seat back. In the preferred embodiment, the seat back is contoured to blend with different combinations of the optional seating planes to provide a plurality of seating surface dimensions and heights, as to where a smaller passenger can be positioned within an adult seat belt system without modifying the natural path of the seat belt system.

3 Claims, 10 Drawing Sheets

DIMENSIONALLY ADJUSTABLE BOOSTER SEAT

CROSS REFERENCE TO RELATED APPLICATIONS

Not Applicable

STATEMENT REGARDING FEDERALLY SPONSORED RESEARCH OR DEVELOPMENT

Not Applicable

BACKGROUND

1. Field of the Invention

This invention relates generally to the field of safety seats. The invention is particularly in the fields of child safety seats or child booster seats. The invention is even more particularly directed to a dimensionally adjustable booster seat for supporting toddlers and adolescents within the confines of adult safety restraint systems.

2. Description of Prior Art

In the early days of transportation people had little concern about seat belts and their use or benefits. But as transportation technology advanced, so did the speeds at which we travel, and the increased need for seat belt use. Seat belt systems are designed to frontally secure adult passengers in modes of transportation. Securing juvenile passengers within the confines of these seat belt systems has required the use of infant safety seats, booster seats and seat belt adaptation devices to secure the juvenile passenger within the seat belt system.

Prior booster seats are designed with and without attached securing members of plastic or straps to frontally secure the child to the booster seat. Booster seats designed with straps attached or frontally securing members, are complicated to adjust and need to have the booster seat attached to the seat of the vehicle of transportation. Booster seats designed without attached securing members rely on guides to position the vehicles seat belts as to properly frontally restrain the child.

Although this type of system works well with an occupant that is of a size to fit within the predetermined confines of the booster seat, the dimensions of the seat and seat belt routing will not correctly secure all sizes of occupants from toddler to teenager. The guides on this type of booster seat also modify the routing of the seat belt, therefore in the case of an accident, any forward movement may cause the seat belt shoulder strap to be pulled taught and cause the booster seat to be pulled from its seated position by the shoulder belt guide. Further the guides may not properly position the seatbelt to fit the occupant across the chest. If the strap is too high it will catch the occupant across the neck or face, and if the strap is too low it will not frontally secure the occupant from being thrown forward. Having a fixed surface dimension or size, both types of systems are unable to perform properly for the full duration in which the booster seat is needed. Both booster seats are made of rigid materials with clothe covers, which make them uncomfortable when used for extended periods of time. Being made of rigid materials, the prior booster seats are less able to absorb shock in the case of a collision. Both types of booster seats are designed with a single seating plane, with the exception of U.S. Pat. No. 5,125,717 to Skold and Tyreso, Jun. 30, 1992 which has two seating planes and a vertically adjustable back rest, and is designed to position a juvenile passenger within an automotive seat belt system. In the case of U.S. Pat. No. 5,125,717, with only two seating planes the booster seat will correctly accommodate a small child of 3 to 5 years of age on the higher seating plane, and a larger child of 10 to 13 years of age on the lower seating plane. If produced on a smaller scale, it may accommodate a child 5 to 10 years of age between the two seating heights. The ability to properly position a child within the seat belt system between the ages of 3 and 13 is compromised. This booster seat stands on downwardly extending legs, which can make it unstable on surfaces that are not flat, such as contoured seats found in most automobiles today. This model must be disassembled, inverted and reassembled for adjustment, and adjustable side supports must be adjusted to fit different occupants. To do this would require ample space because the booster seat would have to be removed from the seat it is placed upon, which is not convenient for the user.

SUMMARY OF THE INVENTION

There are many types of safety seats designed for the purpose of securing children securely in various types of transportation. Some examples are infant seats for forward and rearward positioning of infants, convertible booster seats with frontally securing members or harnesses for toddlers, and open booster seats with seat belt guides designed to frontally secure larger children in adult seat belts.

Heretofore seats are each designed for a specific size or weight range and require the purchase of each type of seat to secure the child safely as they grow to adolescents.

Some of the greatest deficiencies of the heretofore known products are that the duration of use is limited by the size of the occupant. With my present invention the size of the seating surface of the booster seat is adjustable to hold all sizes if children as they grow, and provides proper positioning of the child within the confines of the adult safety restraint system provided.

Heretofore booster seats are generally not comfortable because they are made of rigid materials and/or do not fit the occupant properly. With my present invention being made of pliable materials the invention is comfortable and able to conform to the body of the occupant. Many of the heretofore known seats are complicated to adjust, either in the fitting of the straps or securing system around the occupant, and/or in the proper placement or fit of the booster seat on the seat of the vehicle of transportation. With my present invention these tedious and repetitive adjustments are eliminated.

I have accomplished this by providing a dimensionally adjustable booster seat for positioning an occupant within the confines of an adult safety restraint system, with a seat back and a plurality of optional seating planes that are detachable from and connectable to the seat back in different combinations. The optional seating planes are made in several different sizes and are stacked in various combinations to provide many different seating surface dimensions and heights. The seat back is contoured to blend with several combinations of the optional seating planes. By simply identifying the arrangement, placing it on the seat in the vehicle of transportation and putting on the seat belt, the occupant is properly secured within the vehicle.

An object of the present invention is to provide a booster seat with a dimensionally adjustable seating surface for supporting juvenile persons as they grow.

Another object of the invention is to provide a booster seat that is adjustable in its height, depth and width with a single adjustment.

A further object of the invention is to provide a means for positioning of a juvenile within the confines of an existing adult safety restraint system without modification to the restraint system.

Another object of the invention is to provide a booster seat that is free of webbing, buckles, belt guides and frontally securing members.

Another object of the invention is to provide a booster seat that is pliable letting it sit firmly on a surface designed to support a seated human.

The foregoing and other objects and advantages of this invention will become clear to those skilled in the art upon reading the description of the preferred embodiment, which follows, in conjunction with a review of the appended drawings.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DESCRIPTION OF THE REFERENCE NUMERALS

8. Dimensionally Adjustable Booster Seat
10. Booster Seat Body
11. Trapezoid shape [side view]
12. Trapezoid shape [front view]
13*l*. Lateral leg support, left
13*r*. Lateral leg supports, right
14. Optional seating plane
16. Seat back
18*l*. Torso support, left
18*r*. Torso support, right
19*l*. Head rest, left
19*r*. Head rest, right
23*l*. Lateral leg support, left
23*r*. Lateral leg support, right
24. Optional seating plane
25*l*. Lateral leg support, left
25*r*. Lateral leg support, right
26. Optional seating plane
27*l*. Lateral leg support, left
27*r*. Lateral leg support, right
28. Optional seating plane
29*l*. Lateral leg support, left
29*r*. Lateral leg support, right
30. Optional seating plane
32. Latch device
32*a* Slotted channel
33. Through holes
34. Hook
35 Through slot
36 Open upper end
38. Latch release cable

DETAILED DESCRIPTION OF THE PREFERRED EMBODIMENTS

Figure 3:
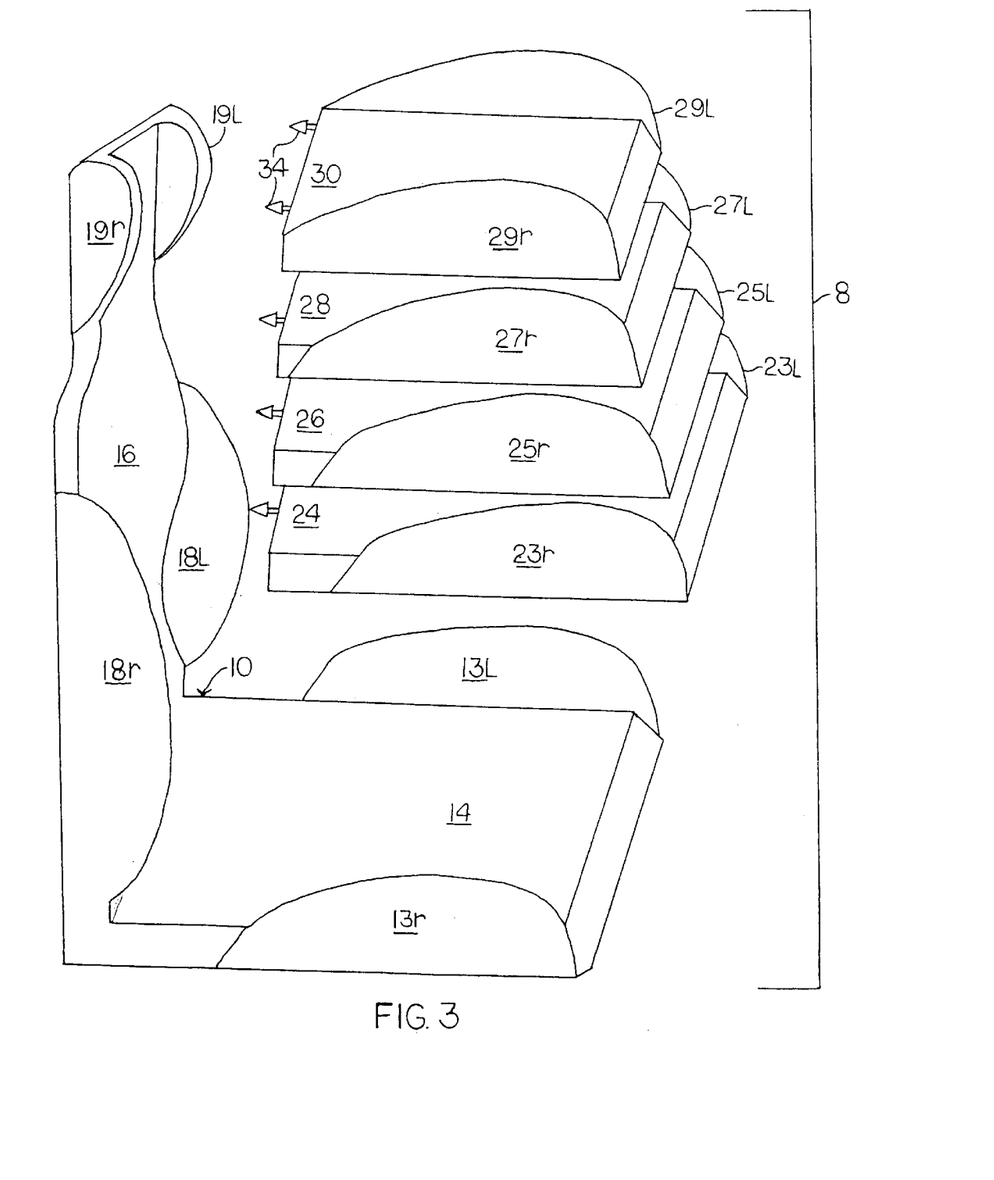
FIG. 3 is a partially exploded view of a dimensionally adjustable booster seat.
Figure 3A:
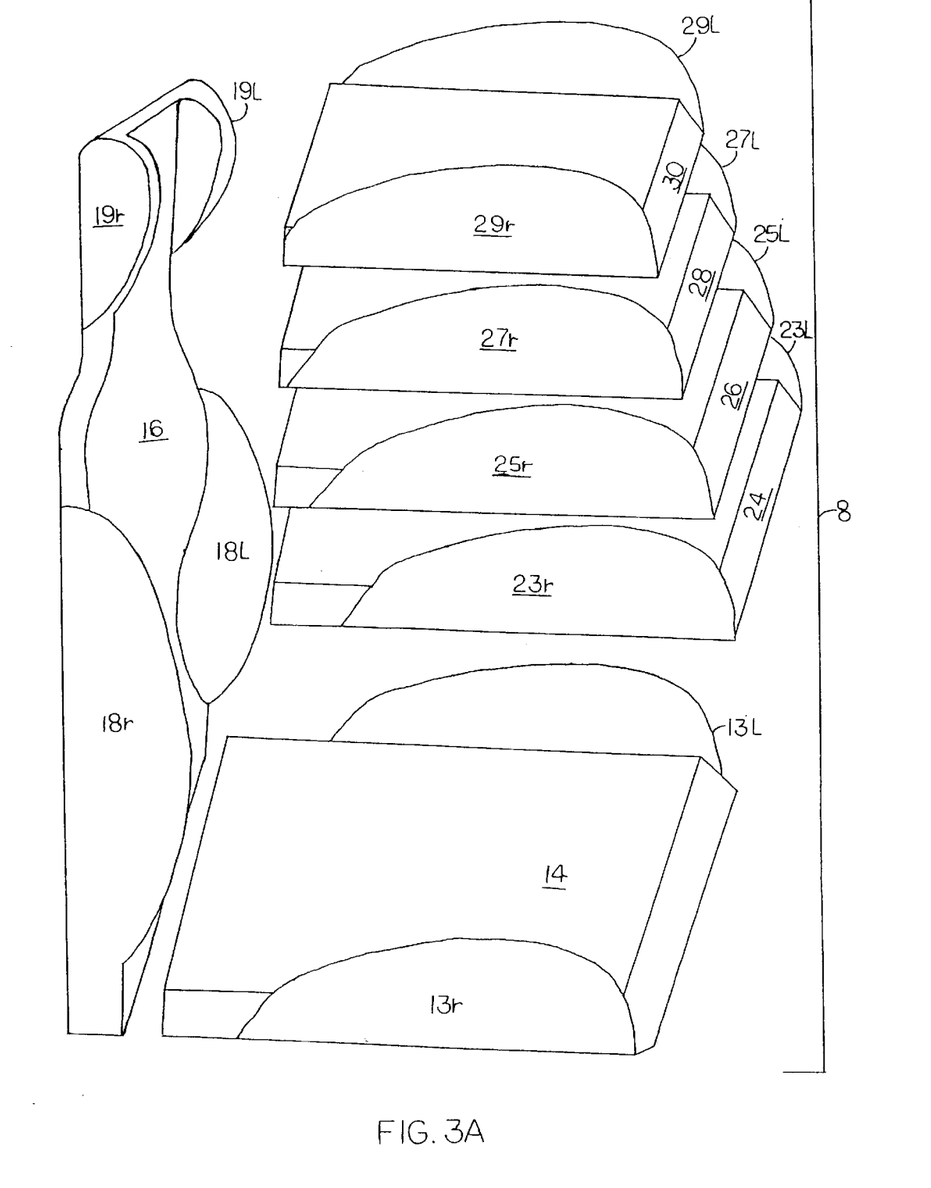
FIG. 3a is an exploded view of a dimensionally adjustable booster seat in accordance with a preferred embodiment of the present invention
Figure 5:
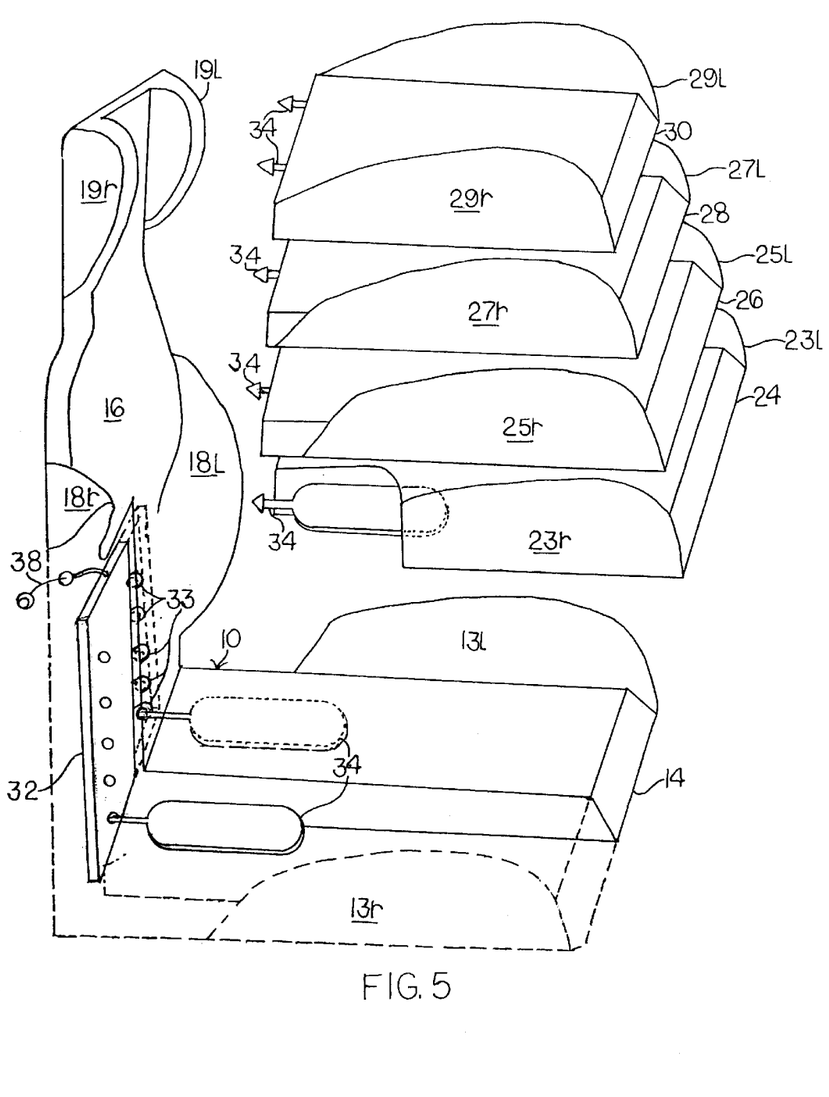
FIG. 5 is an exploded perspective cut away view showing a preferred latch system.

Turning now to the drawings, FIG. 3a shows an over all perspective exploded view of a dimensionally adjustable booster seat 8. The booster seat comprises in combination, a seat back 16 and a set of multiple optional seating layers or planes, 14, 24, 26, 28, and 30. Seat back 16 has lumbar or torso supports 18*l* and 18*r* [left and right], extending forward and vertically from near the lower outer edges and curve back to blend into seat back 16. Torso supports 18*l* and 18*r* are opposing and are curved inward to cover part of seat back 16. Seat back 16 also comprises head supports or head rests 19*l* and 19*r* [left and right], extending forward and downward from the upper and outer corners of seat back 16. In FIG. 5 a coupler or latch device 32 is positioned in the lower center of seat back 16, for detachably receiving any combination of optional seating planes 14, 24, 26, 28 and/or 30 to seat back 16.

Figure 1:
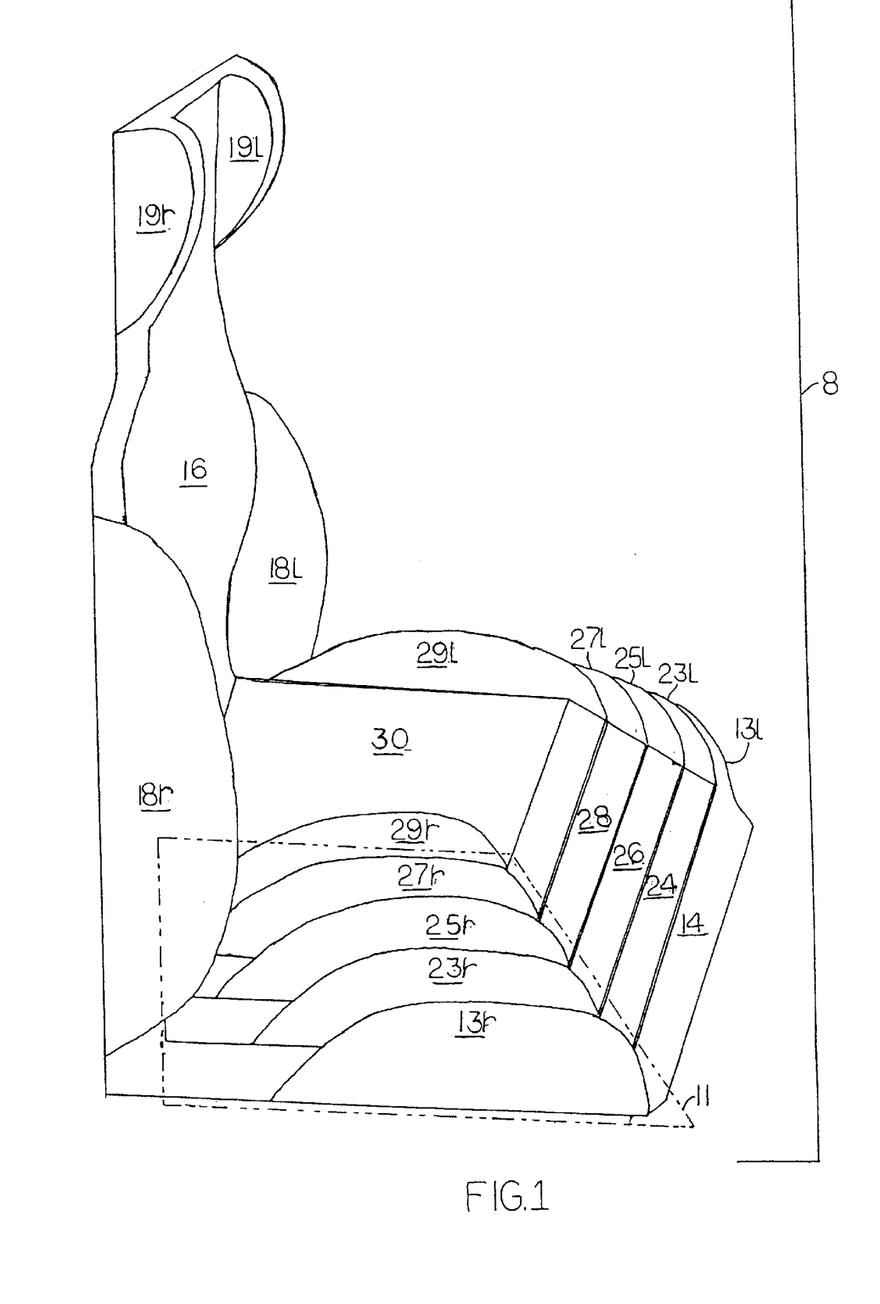
FIG. 1 a perspective view of an adjustable booster seat in accordance with a preferred embodiment of the present invention.
Figure 2:
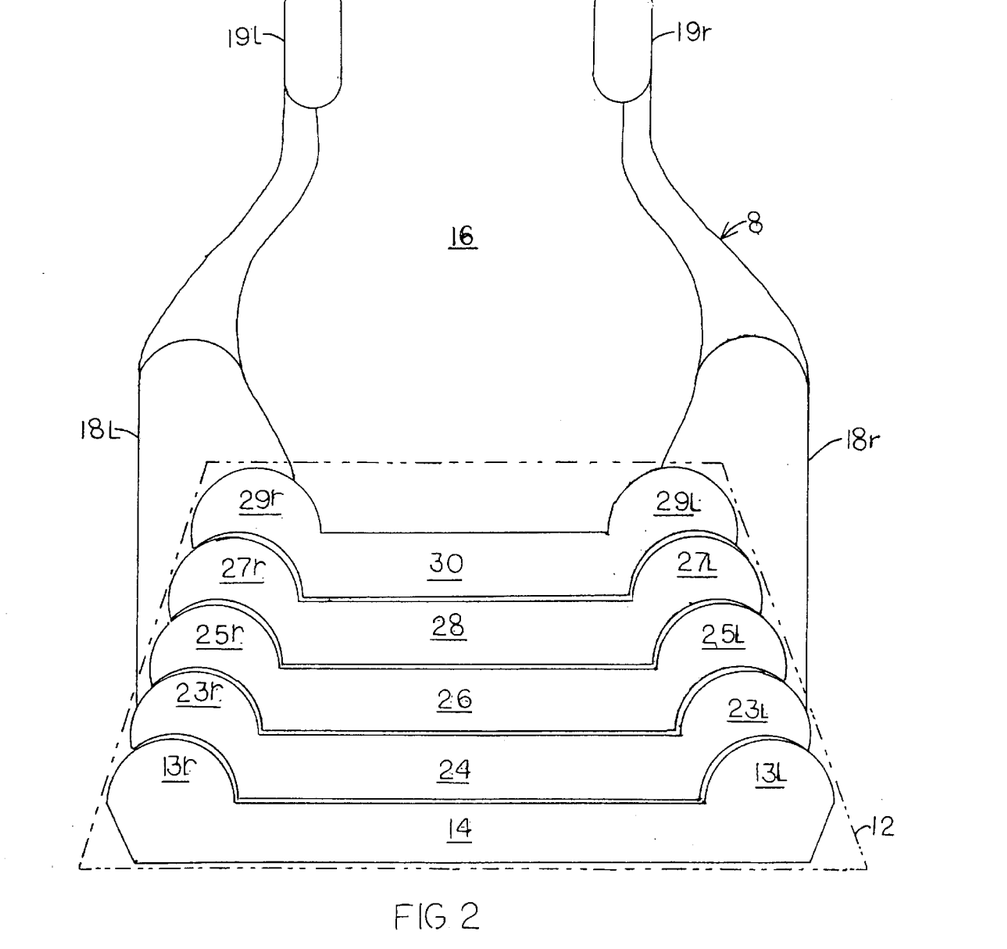
FIG. 2 is a front view of FIG. 1.
Figure 7:
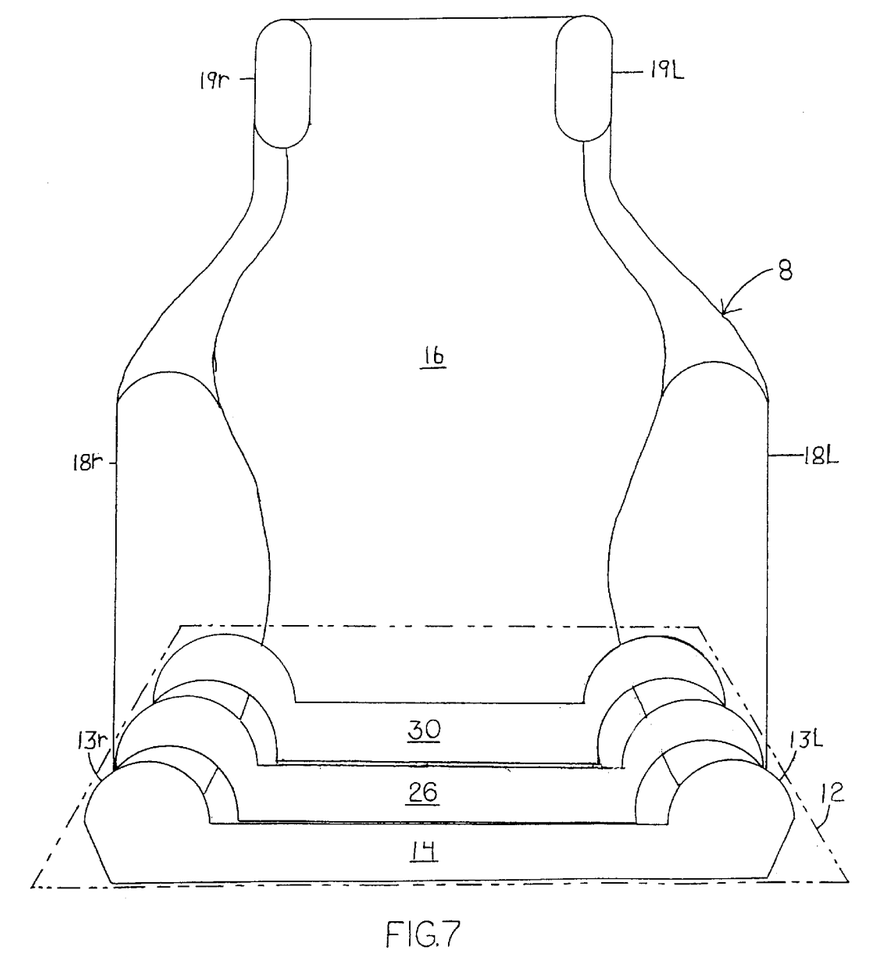
FIG. 7 is a front view of a dimensionally adjustable booster seat displaying an alternate sequence of optional seating planes.

In FIGS. 1, 2, 3, 3a, booster seat 8 comprises multiple optional seating planes 14, 24,26, 28 and 30, each comprise a set of lateral leg supports 13*l* and 13*r*, 23*l* and 23*r*, 25*l* and 25*r*, 27*l* and 27*r* or 29*l* and 29*r*, protruding upward and outward from the front outer corners, extending towards the rear, along the outer edge of the respective seating plane 14, 24, 26, 28 or 30. Optional seating planes 14, 24,26, 28 and 30 are duplicated in graduations of a scale. Each of the optional seating planes 14–30 are formed to be shorter from front to back and narrower from side to side, and the radius' of torso supports are reduced in relation to the seating plane disposed below. In FIG. 1 when optional seating planes 14,24,26,28 and 30 are stacked on top of one another, the side view displays a trapezoid shape 11. In FIGS. 2, 4a and 7, when a combination of optional seating planes are stacked on top of one another, the front view displays a trapezoid shape 12. In FIG. 3 and FIG. 5 seat back 16 is attached to optional seating plane 14 and seating planes 24, 26, 28 and 30 are singly optionally detachable from and attachable to seat back 16.

Figure 3B:
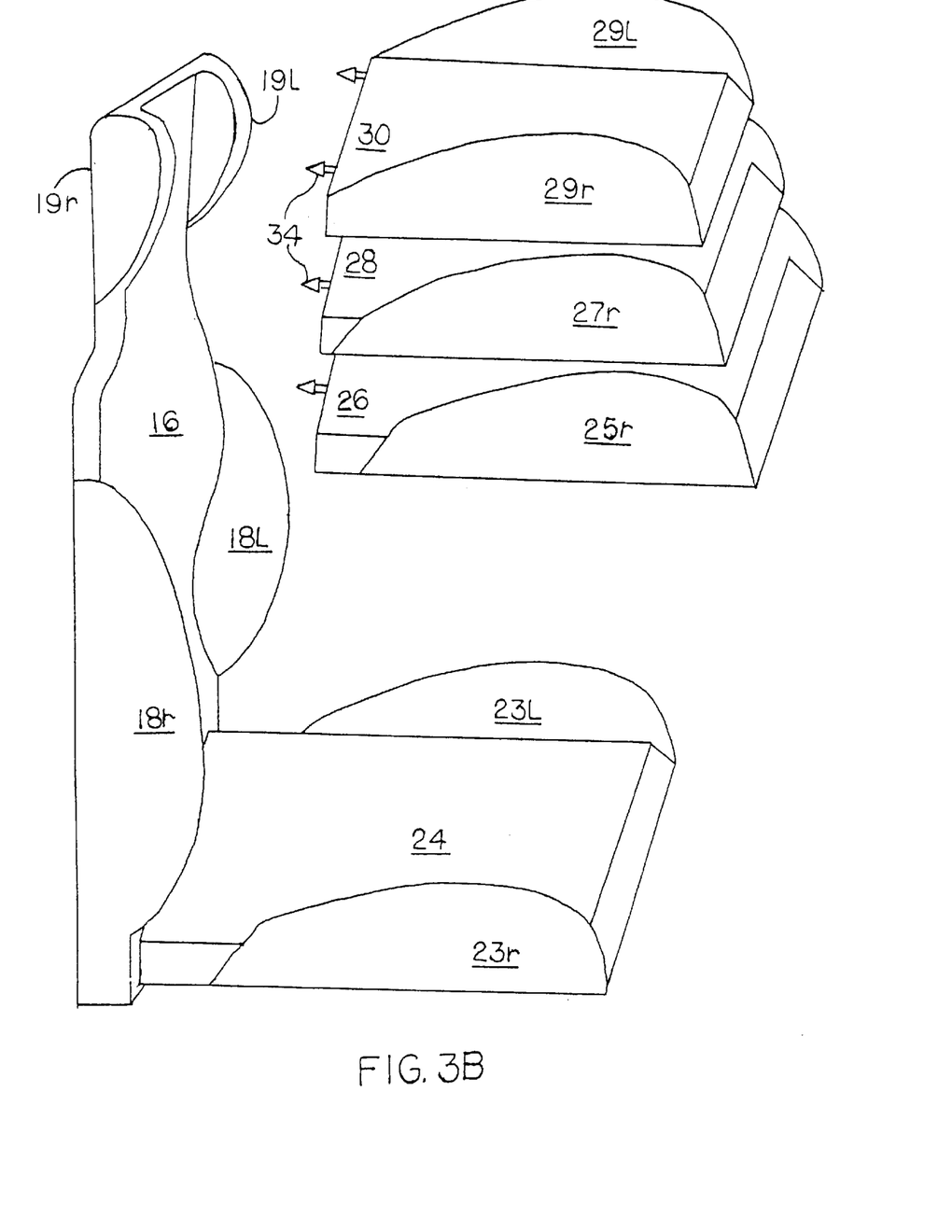
FIG. 3b is a partially exploded view of a dimensionally adjustable booster seat displaying an alternate sequence of optional seating planes.

In FIG. 1 and FIG. 2 seating plane 24 rests on seating plane 14, seating plane 24 is narrower from side to side, and shorter from front to back than seating plane 14. The bottom of seating plane 24 is contoured to sit firmly upon the top of seating plane 14. Seating plane 26 rests on seating plane 24, while seating plane 26 is narrower from side to side and shorter from front to back than seating plane 24. The bottom of seating plane 26 is contoured to sit firmly upon the top of seating plane 24. Seating plane 28 rests on seating plane 26. Seating plane 28 is narrower from side to side, and shorter from front to back than seating plane 26. The bottom of seating plane 28 is contoured to sit firmly upon seating plane 26. Seating plane 30 rests on seating plane 28. Seating plane 30 is narrower from side to side, and shorter from front to back than seating plane 28. The bottom of seating plane 30 is contoured to sit firmly upon seating plane 28. The top surface of each optional seating plane is complimentarily fitted to the bottom of a combination of reduced optional seating planes. In FIG. 5 latch 32 and a hook 34 provide a connection for detachably receiving optional seating planes 14, 24, 26, 28 and 30 to seat back 16. In all Figures seat back 16 is formed with torso supports 18*l* and 18*r*, the widths and the radius' of the lumbar are shaped as to blend with the contours of the optional seating planes. In FIG. 3B, seating plane 14 is omitted and seating plane 24 is connected to seat back 16 as the bottom most seating plane. In FIG. 3*c* seating planes 24 and 28 are omitted.

In all Figures the dimensionally adjustable booster shown is made of a resin and catalyst foam rubber compound, used to make pliable cushions of many different densities and shapes. The desired shapes can be achieved by mixing the compounds and adding them into a mold cavity of the desired shape and allowing it to cure. The foam rubber is mixed to produce the to product at a density to allow approximately one inch of compression, according to the maximum size of the occupant that will be placed on the exposed seating plane 14, 24, 26, 28, or 30. The compound for seat back 16 is produced at densities to provide positive shock absorbing qualities in relation to the mass of the human body.

In FIG. 5 latch device 32 is imbedded in to the material of seat back 16 by supporting latch 32 within a mold securely in place while the foam rubber compound is added to the mold. Through holes 33 are formed in seat back 16 to allow access of hook 34 to latch device 32. Hook 34 is imbedded into the material of each of the optional seating planes, 14, 24, 26, 28 and 30 by securing hook 34 within a mold while the foam rubber material is added into the mold. Hook 34 is made of plastic or metal in the shape of a post with a cone shape on the tip of the post that pushes into latch device 32. A latch release cable 38 opens latch 32 to release hook 34. In FIG. 4A, a slotted channel 32A is imbedded into the material of seat back 16 allowing a through slot 35 with an open upper end 36. A hook 34A is made of metal or plastic, is a post with a tip large enough to be slipped into a slotted channel 32A at open end 36. Channel 32A is made of metal or plastic.

Figure 6:
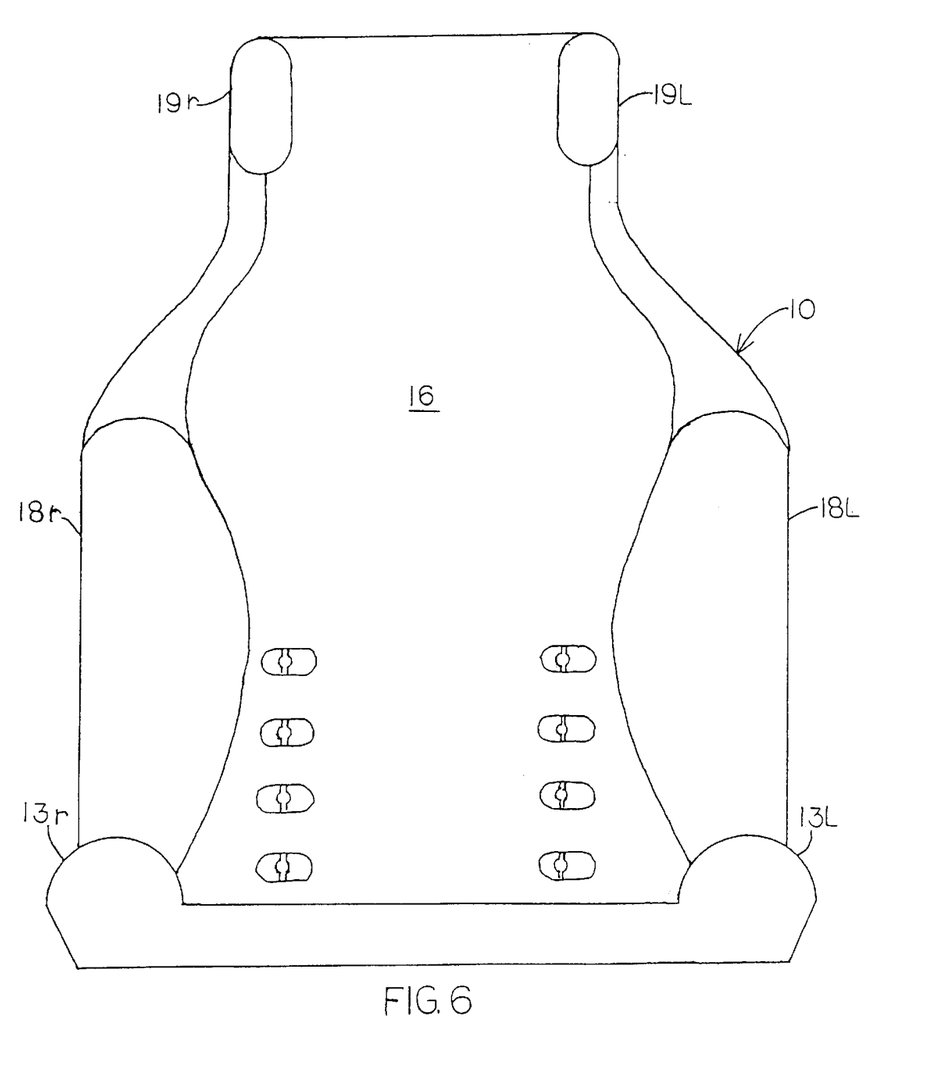
FIG. 6 is a front view with all but one seating plane removed.

In the preferred embodiment of the dimensionally adjustable booster seat, the operation and functions are as follows. Beginning with FIG. 3A seat back 16, torso supports 18*l* and 18*r*, and headrests 19*l* and 19*r* are molded as one unit. Optional seating plane 14, two lateral leg supports 13*l* and 13*r* are molded as one unit. Optional seating plane 24, two lateral leg supports 23*l* and 23*r* are molded as one unit. Optional seating plane 26, two lateral leg supports 25*l* and 25*r* are molded as one unit. Optional seating plane 28, two lateral leg supports 27*l* and 27*r* are molded as one unit. Optional seating plane 30, two lateral leg supports 29*l* and 29*r* are molded as one unit. In FIG. 5 seating plane 14 is connected to seat back 16 by coupling hook 34 to latch 32 at seat back 16 to form a seat body 10. In reference to FIG. 6, by placing seat body 10 on a seat meant for an adult passenger, the booster seat body 10 can support a child weighing approximately 80 to 95 pounds, as to where the seat belt shoulder strap meant for an adult passenger, crosses the juvenile across the clavicle, securing them properly.

A child that is between 50 and 65 pounds will require a higher seating plane, to bring the child up to where they will be properly positioned in the adult safety restraint system. They will also need a narrower seating surface to accommodate a smaller hip width, and a shorter seating plane to accommodate a shorter leg, as to let the leg bend at the knee for a more comfortable position than if the leg had to be extended on a longer surface. The occupant will also require less of a seat back height, to set the head of the occupant in the area of seat back 16 designed as head rests 19*l* and 19*r*. The occupant will also require a narrower seat back to set against in comparison to the child weighing 80 to 95 pounds.

Figure 4:
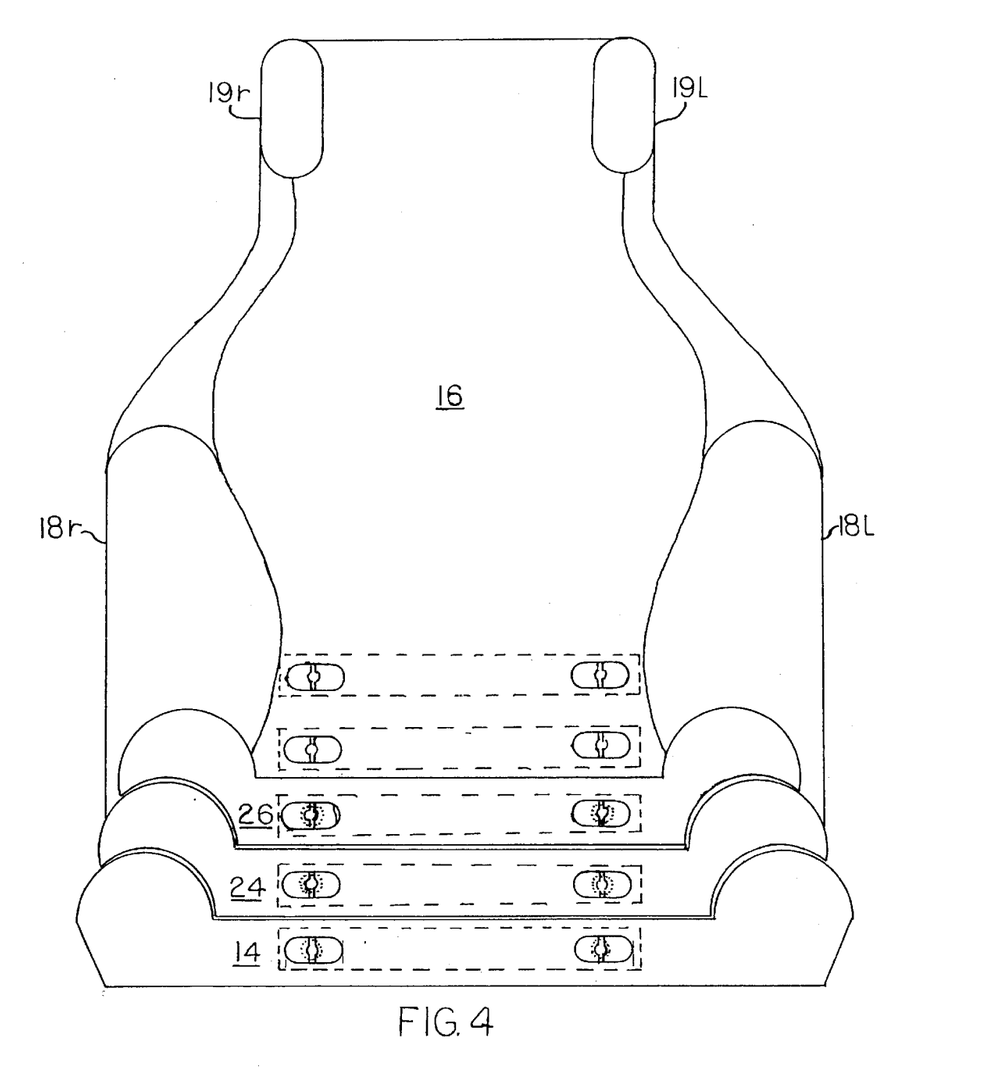
FIG. 4 is a front view with two upper seating planes removed and an exposed latch mechanism.
Figure 4A:
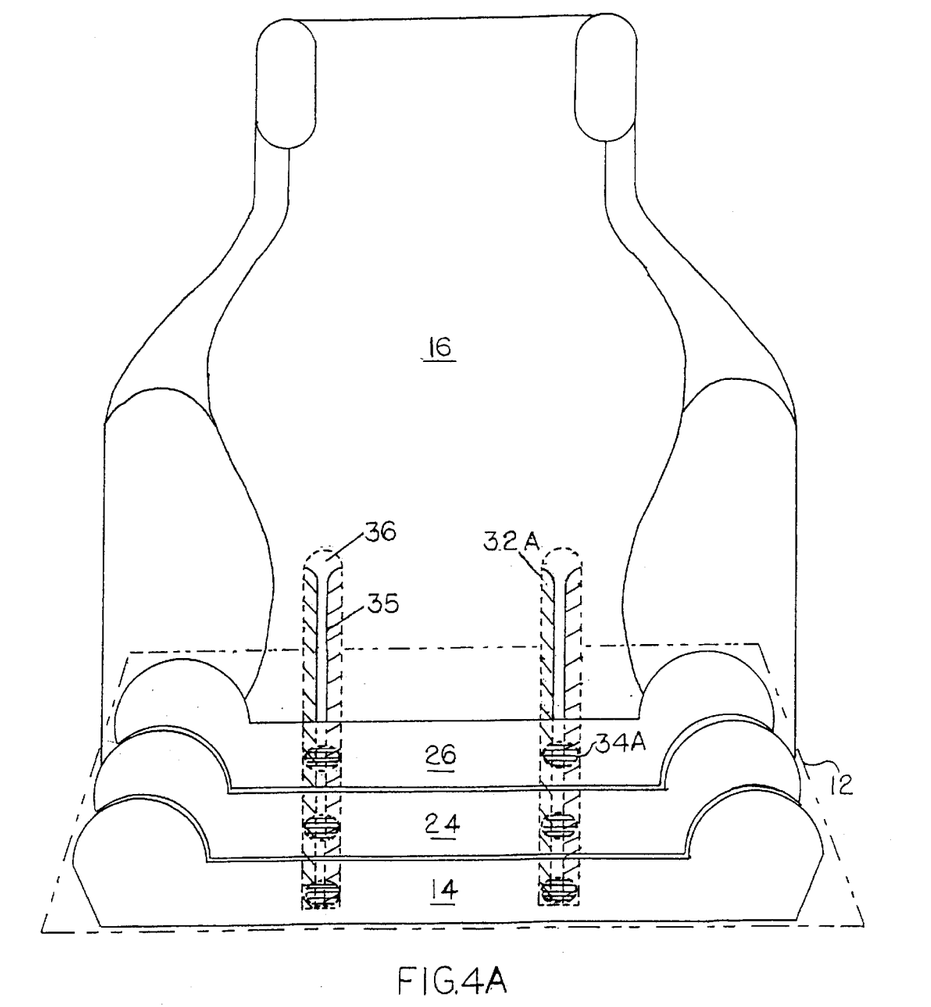
FIG. 4a is a front view with two upper seating planes removed and an exposed second latch mechanism.

In FIG. 4 where optional seating planes 24 and 26 are added to seat back 16, five dimensions of the exposed seating surface have changed. First, the elevation of the seating surface is increased by attaching seating planes 24 and 26 to seat back 16. This elevation determines where the occupant's shoulders will be in relation to the restraint system provided in a vehicle of transportation. Second, the width of the seating surface is narrower than the width of the two seating planes 24 and 14 disposed below, to accommodate a smaller hip width. Third, the exposed length of optional seating plane 26 from front to back is shorter than optional seating planes 24 and 14 disposed below. Fourth, the distance between the top of seat back 16 and optional seating plane 26 is reduced for positioning the head of the occupant between head rests 19*l* and 19*r*. Fifth, the width of the distance between the torso supports 18*l* and 18*r* at the level of optional seating plane 26 is reduced to accommodate supporting a smaller torso.

In FIG. 2, the same five dimensions are reduced again each time an additional optional seating plane 28 and 30 is added to seat back 16. Thus providing a dimensionally adjustable booster seat 8 for positioning a growing juvenile passenger within the confines of an adult safety restraint system, without modification to the routing of the restraint system. In FIG. 7 the optional seating planes 14, 26, and 30 only are attached to seat back 16 showing even further adjustability in relation to the build or posture of the occupant, or the type of seat the dimensionally adjustable booster seat 8 will be placed upon.

The detailed description has been provided for purposes of illustration and not for purposes of limitation.

Conclusion, Ramifications and Scope

Accordingly the reader will see that the invention of the dimensionally adjustable booster seat is used to position growing children within the confines of an adult safety restrain system, by adjusting the seat to a specific seating height and providing a dimensionally adjustable seating surface.

While my above description contains many specificity's, these should not be construed as limitations on the scope of the invention, but rather an example of one preferred embodiment thereof. Many other variations are possible, for example, The seat back may contain more than one density of foam within the seat back, such as a pocket of a lesser density of foam in the area of the head rest, to provide a higher level of shock absorption as related to safety and comfort.

The booster seat may have expandable bladders within the foam rubber for customizing the shape or size of the booster seats exposed seating surface and backrest.

A removable cover can be provided, or the finish of the foam material can be non-porous or formed with a skin to provide easy cleaning.

The combination of elements that provide the adjustable booster seat may be used as an adjustable primary seat in modes of transportation to accommodate people of all ages, by simply mounting the seat back to the vehicle and providing the appropriately sized optional seating planes.

The booster seat may be formed or shaped by molding, either cold pouring of 2 part compounds, hot injection molding or by cutting or machining and gluing, or forming.

What is claimed is:

1. A dimensionally adjustable booster seat for dimensionally positioning a juvenile user within an adult seat system without modification to a path of a seat belt system, said booster seat comprising: a seat back having a generally flat backside and a contoured front side having outer edges, said contoured front side providing a generally flat contact area, said contoured front side further comprising opposing side supports protruding forward from the outer edges of the front side wherein said outer edges are curved inward toward a center of the contoured front side such that the seat back widens above and below the opposing side supports and narrows between the opposing side supports, a plurality of optional seating planes produced in a graduation of scale such that each optional seating plane has a top surface, a bottom surface, and opposing side edges with lateral leg supports wherein the bottom surface is wider than the top surface such that each optional seating plane has a cross section with a generally trapezoidal shape, wherein said plurality of optional seating planes are stacked one on top of another such that the top surface of an uppermost optional seating plane forms a seating surface for the user and the subsequent lower optional seating planes elevate the user with respect to the seat back wherein each optional seating plane is removable to expose the top surface of a lower optional seating plane that has a wider seating surface, means for detachably receiving said plurality of optional seating planes along said contoured front surface of said seat back, and said bottom surface of a lowermost optional seating plane connected to the seat back and set on a seating surface of said adult seat system.

2. A dimensionally adjustable booster seat of claim 1, wherein the optional seating planes and the seat back are made of a pliable material to conform to and sit firmly on any adult passenger seat with a seat belt system and provide a comfortable dimensionally adjustable booster seat with shock absorbing qualities.

3. A dimensionally adjustable booster seat of claim 1, wherein the means for detachably receiving combinations of optional seating planes is a quick release mechanism.

* * * * *